J. H. ANDERSON.
TIRE ARMOR.
APPLICATION FILED SEPT. 16, 1913.
1,130,562. Patented Mar. 2, 1915.
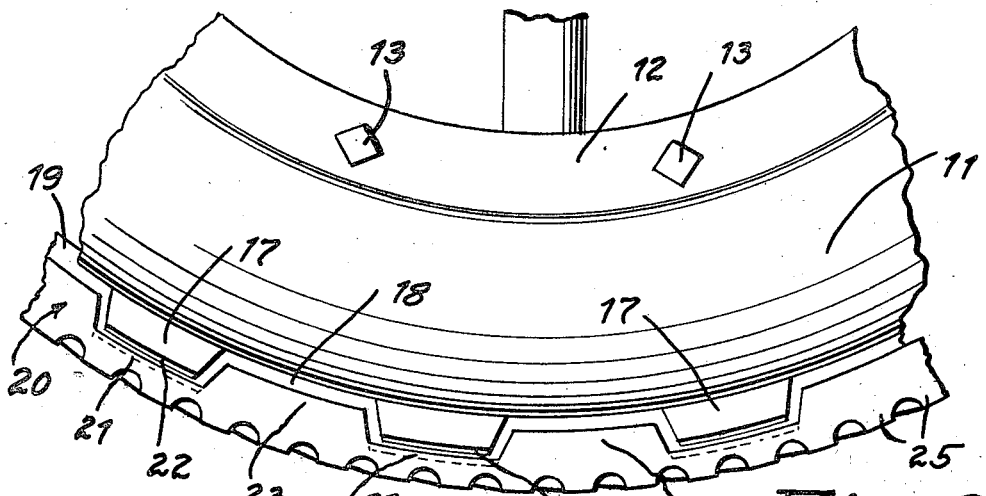
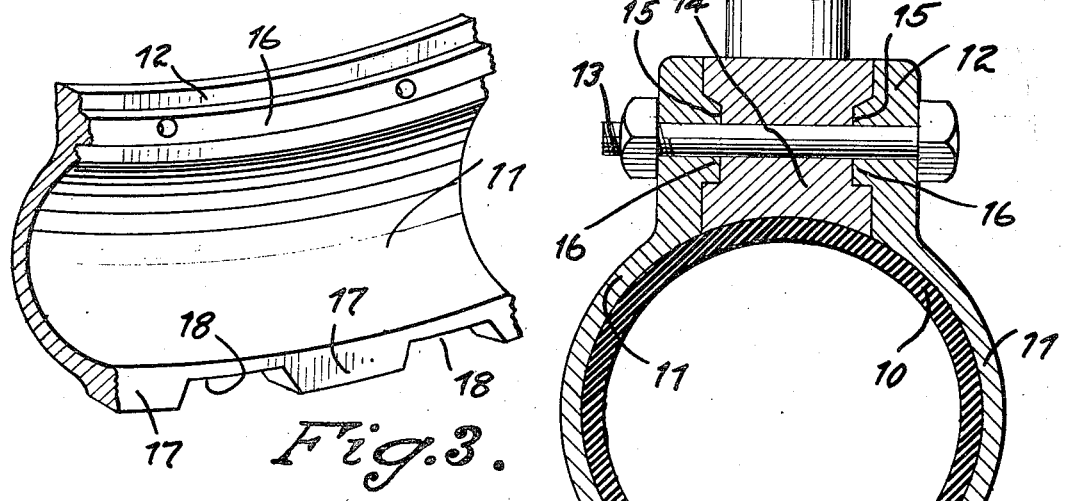
Inventor
J. H. Anderson

# UNITED STATES PATENT OFFICE.

JAMES H. ANDERSON, OF CHICAGO, ILLINOIS.

TIRE-ARMOR.

1,130,562. Specification of Letters Patent. Patented Mar. 2, 1915.

Application filed September 16, 1913. Serial No. 790,053.

*To all whom it may concern:*

Be it known that I, JAMES H. ANDERSON, a citizen of the United States, residing at Chicago, in the county of Cook, State of Illinois, have invented certain new and useful Improvements in Tire-Armors; and I do hereby declare the following to be a full, clear, and exact description of the invention, such as will enable others skilled in the art to which it appertains to make and use the same.

This invention relates to improvements in tires, and particularly to armors therefor.

One object of the invention is to provide a combined tread armor and antiskidding device.

Another object is to provide a protective casing for the tire on which is mounted an antiskidding tread.

Other objects and advantages will be apparent from the following description, when taken in connection with the accompanying drawings.

In the drawings: Figure 1 is a side elevation of a portion of a tire made in accordance with my invention. Fig. 2 is a transverse section through the tire. Fig. 3 is a perspective view of a portion of the movable tread. Fig. 4 is a perspective view of a portion of the tire casing.

Referring particularly to the accompanying drawings, 10 represents an ordinary single tube pneumatic tire which is adapted to be incased within my improved protector. My casing comprises the oppositely disposed concavo convex rings 11 which embrace the tire on the sides thereof. Each of the rings is provided with annular flanges extending inwardly toward the center of the wheel as indicated at 12, these flanges being arranged to receive the clamping bolts 13 which pass through the rim 14 and securely clamp the sections of the casing on the tire and to the rim. The rim has the circumferential extending channels 15 on opposite sides thereof to receive the braces 16 carried on the inner faces of the flanges 12. On the outer peripheries of the rings 11, namely the portions disposed at the tread of the tire are provided with circular series of outwardly radiating projections 17 and recesses 18. The said peripheries of the rings 11 are spaced apart to receive therebetween the inwardly projecting circumferential rib 19 formed on the armor tread 20. This armor 20 is in the form of an endless metal band, and has on its opposite sides the shoulders 21, these shoulders projecting below the peripheral portions 17. The peripheral faces 17 of each of the rings 11 are slightly inclined toward the center of the tread, as well as the projections thereof. The shoulders 21 are inclined in a manner corresponding to the peripheries of the rings and are also formed with a plurality of recesses 22 and projections 23 for interlocking engagement with the projections and recesses of the rings 11. The rib 19 has its inner face concaved as indicated at 24 and bears against the outer or tread portion of the tire 10 between the peripheries of the rings 11. The outer or tread face of the ring 20 is provided with the corrugations 25 to prevent skidding of the tire.

The projections and recesses of the rings 11 and the shoulders 21 have a slight play of approximately one-fourth of an inch or more, and are always in engagement. Thus the tread member 20 can move bodily vertically, but is prevented from lateral movement between the peripheries of the rings 11 and also from circumferential or creeping movement thereon by means of the projections and recesses.

With an armor and a casing of this character, a much cheaper grade of tire can be used, and the same be thoroughly protected both on the sides and at the tread.

What is claimed is:—

In a tire protector, a casing comprising two concavo-convex rings arranged on opposite sides of a pneumatic tire, both the inner and outer portions of the rings being extended radially of the tire in parallel relation, the inner parallel portions being secured to the rim, the outer parallel portions having peripheral lugs and recesses arranged alternately therearound, the end faces of said lugs being oppositely inclined, and a tread member disposed between the outer parallel portions of the rims, said tread member having an inwardly directed portion engaging the pneumatic tire and laterally disposed shoulders facing toward the center of the tire, said shoulders being formed with inwardly directed lugs and recesses having their ends oppositely inclined and loosely engaging with the lugs and recesses of the rings.

In testimony whereof, I affix my signature, in the presence of two witnesses.

JAMES H. ANDERSON.

Witnesses:
GEORGE J. ORRIS,
HILDA ERICKSON.